United States Patent [19]

Uya et al.

[11] Patent Number: 5,694,560
[45] Date of Patent: *Dec. 2, 1997

[54] WORKSTATION FOR DISPLAYING DYNAMIC IMAGE WITH REAL-TIME SPECIAL EFFECTS

[75] Inventors: Masaru Uya; Norihiko Mizobata; Takuya Sayama; Satoshi Takahashi; Takeshi Ichise; Takeshi Kawano; Taizo Tsujimoto, all of Osaka, Japan

[73] Assignee: Matsushita Electric Industrial Co., Ltd., Osaka, Japan

[*] Notice: The term of this patent shall not extend beyond the expiration date of Pat. No. 5,524,197.

[21] Appl. No.: 579,131

[22] Filed: Dec. 27, 1995

Related U.S. Application Data

[62] Division of Ser. No. 944,385, Sep. 14, 1992, Pat. No. 5,524,197.

[30] Foreign Application Priority Data

Sep. 13, 1991 [JP] Japan .................. 3-234585

[51] Int. Cl.$^6$ .................................................. G06F 15/00
[52] U.S. Cl. .......................... 395/340; 395/173; 395/508; 395/518
[58] Field of Search .................................... 395/135, 152, 395/154, 155, 157, 158, 160, 161, 340, 344, 173, 508, 509, 518

[56] References Cited

U.S. PATENT DOCUMENTS

| | | | |
|---|---|---|---|
| 4,873,652 | 10/1989 | Pilat et al. | 395/340 |
| 4,882,687 | 11/1989 | Gordon | 395/135 |
| 5,043,923 | 8/1991 | Joy et al. | 395/508 |
| 5,220,312 | 6/1993 | Lumelsky et al. | 345/190 |
| 5,241,656 | 8/1993 | Loucks et al. | 395/345 |
| 5,245,322 | 9/1993 | Dinwiddie, Jr. et al. | 345/115 |
| 5,289,574 | 2/1994 | Sawyer | 395/332 |
| 5,291,582 | 3/1994 | Drako et al. | 395/846 |
| 5,293,483 | 3/1994 | Mizobata | 395/508 |
| 5,347,624 | 9/1994 | Takanashi et al. | 395/135 |

FOREIGN PATENT DOCUMENTS

2-155030  6/1990  Japan ................... G06F 14/00

*Primary Examiner*—Mark R. Powell
*Assistant Examiner*—Ba Huynh
*Attorney, Agent, or Firm*—Lowe, Price, LeBlanc & Becker

[57] ABSTRACT

A dynamic-image displaying workstation provided with a display device for displaying an image, a video signal processing circuit for outputting dynamic-image data representing a dynamic image corresponding to a video signal, a first dual port memory for receiving and storing the dynamic-image data outputted from the video signal processing circuit, a second dual port memory for storing data representing pixels of an image to be displayed by the display device, and a third dual port memory for storing data representing a window area. The window area is an area of a window, to which the dynamic-image belongs, and is not covered by any other windows. The workstation is further provided with a fourth dual port memory for storing data representing a dynamic-image display effective area corresponding to the dynamic image represented by the dynamic-image stored in the first dual port memory, a data selector for receiving data read from the first dual port memory at a first input terminal thereof, and data read from the second dual port memory at a second input terminal thereof, for selecting one of the third and fourth dual port memories and receiving data read from the selected dual port memory at a third input terminal thereof, for selecting the data received at the first input terminal thereof if the data read from the third dual port memory is the data representing the window area, and the data read from the third dual port memory is the data representing the dynamic-image display effective area, for selecting the data received at the second input terminal thereof and for outputting a signal representing the selected data to the display device.

5 Claims, 9 Drawing Sheets

WORKSTATION FOR DISPLAYING DYNAMIC IMAGE WITH REAL-TIME SPECIAL EFFECTS

This application is a divisional of application Ser. No. 07/944,385 filed Sep. 14, 1992 (now U.S. Pat. No. 5,524,197).

BACKGROUND OF THE INVENTION

1. Field of the Invention

This invention generally relates to a workstation, which employs a time-sharing/multi-tasking operating system (OS) such as UNIX (incidentally, UNIX is a registered trademark of American Telephone and Telegraph Corporation) and runs what is called a multiple-window system such as X windows (incidentally, X windows is a registered trademark of Massachusetts Institute of Technology (hereunder sometimes referred to as X window system)) and can display a dynamic image such as a video image in a specified window, (hereunder sometimes referred to as a dynamic-image displaying workstation) and more particularly to a dynamic-image displaying workstation which can perform a special-effect operation such as an automatic zooming, which requires a real time processing, in real time.

2. Description of the Related Art

In recent years, what is called a multi-media computer has been developed, which uses what is called time-based media such as audio media and video dynamic-images in addition to conventional media such as characters and graphic forms, with the intention of providing computer users with a computer which is easier to operate.

Where such a multi-media computer is realized by employing a workstation which excels in interactive processing, the workstation sometimes runs a multiple-window system such as the X window system, and makes a video dynamic-image belong to (namely, contained in) and displayed in a window. Incidentally, when a video dynamic-image is made to belong to (namely, to be contained in) a window, if the window, to which the video dynamic-image belongs, is covered (or overlapped) by another window, a part or all of the video dynamic-image, which is contained in the overlapped part of the former window, is also covered by the latter window. Further, if the window, to which the video dynamic-image belongs, is moved, the video dynamic-image is similarly moved in such a manner not to change the position thereof in the moved window. Namely, the same processing is performed on a window and a video dynamic-image contained therein.

Figure 9:
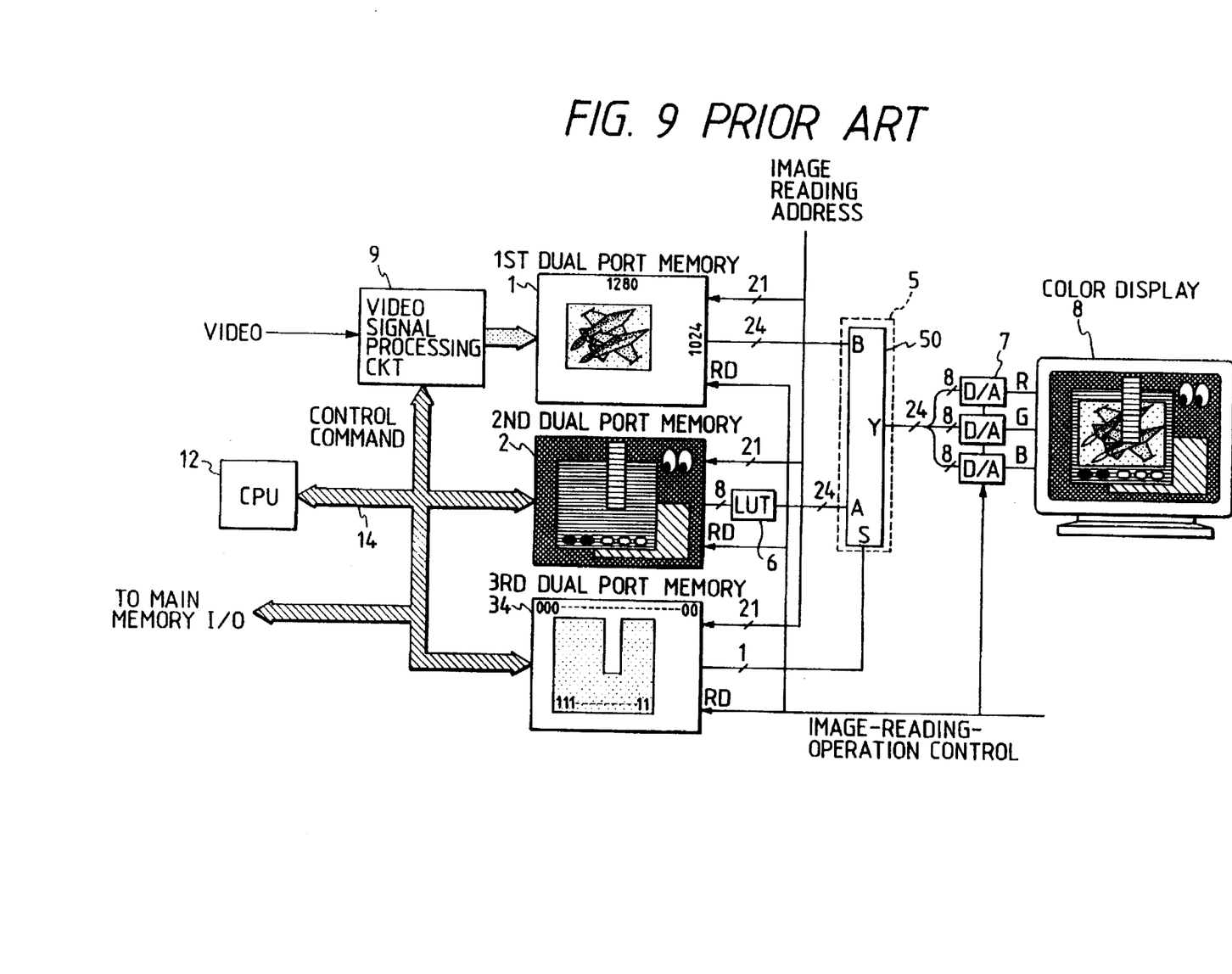
FIG. 9 is a schematic block diagram for illustrating the configuration of a conventional dynamic-image displaying workstation.

Referring to FIG. 9, there is illustrated the configuration of such a conventional dynamic-image displaying workstation.

A central processing unit (CPU) 12 of the conventional workstation runs (namely, executes) UNIX, which is a time-sharing/multi-tasking OS, and the X window system, which is what is called a multiple-window system. Further, the CPU 12 receives data from and sends data to a main memory and input/output (I/O) devices such as a hard disk through a data bus 14. Dual port memories 1, 2 and 34 are conventional graphic frame memories, each of which usually consists of a video random-access-memory (VRAM). Further, data can be read from and written to a first port (namely, a left port as viewed in this figure) of each of the memories 1, 2 and 34. Furthermore, data can be read from a second port (namely, a right port as viewed in this figure) of each of the memories 1, 2 and 34 The number of pixels displayed horizontally and vertically on a display device of the workstation (namely, the resolution of the display device thereof) are 1280 and 1024, respectively. The memories (hereunder sometimes referred to as the buffers) 1, 2 and 34 store 24-bit data, 8-bit data and 1-bit data corresponding to each pixel, respectively. Analog data represented by video signals (more particularly, National Television System Committee (NTSC) composite video signals in this case) inputted from an external device are converted by a video-signal processing circuit 9 into digital data. Then, a predetermined processing is further performed therein and data corresponding to one field of a video image is outputted therefrom every (1/60) seconds. The CPU 12 sets control commands describing the contents of the information on various processing to be performed on video signals. The contents of the information are, for example, positions on the screen of an external display device, which define an original picture including a video dynamic-image to be inputted to the workstation, the size of the input image, scaling parameters or factor, positions on the screen of a display device of the workstation, which define the video dynamic-image, the size of the video dynamic-image and contrast/luminance control parameters. The video signal processing circuit 9 writes data representing the video dynamic-image to the dual port memory 1 from the first port thereof and controls the data. The workstation has what is called a key plane of the memory 34 which serves to control whether or not the video image represented by the buffer or memory 1 is displayed on the screen of a color display device 8 and whether or not each pixel of graphic forms and characters represented by data stored in the buffer or memory 2 is displayed thereon. In case of this conventional workstation, a value of 1 is stored correspondingly to each pixel of the video dynamic-image at a corresponding location of the memory 34. In contrast, a value of 0 is stored correspondingly to each pixel of the graphic forms and characters at a corresponding location thereof. Further, the workstation translates 8-bit output data read from the memory 2, which indicates one of 256 kinds of colors, into 24-bit color data by using a color lookup table (or a color map) 6. A data selector 5 is practically a multiplexer 50 which selects color data originated from the memory 2 if input data S is 0 and selects color data originated from the memory 1 if input data S is 1. A signal representing output data of the data selector 5 is converted by a digital-to-analog (D/A) converter 7 into an analog red-green-blue (RGB) video signal, from which a color image is then displayed on the screen of a color display 8. If an image-data reading control signal and an image-data reading address signal, which are synchronized with the video signal sent to the color display 8, are supplied to the D/A converter 7 and the memories, respectively, as illustrated in FIG. 9, a video dynamic-image (in this case, a dynamic image of jet planes) can be displayed in a window of the multiple-window, to which the dynamic image belongs, on the screen of the color display 8 of this figure. At that time, the CPU 12 should write data representing the form of the part of the dynamic image, which is not covered by another window, to the key plane 34 quickly responding to a user's manipulation of a window. FIG. 9 illustrates a state in which the window containing the video dynamic-image is covered or screened by a pull-down menu window (hereunder sometimes referred to simply as a pull-down menu) which has a long length-ways rectangle. The pull-down menu is created and destroyed by manipulating a mouse of the workstation. Next, when the mouse is manipulated to destroy the pull-down menu in the state of FIG. 9, an event interruption is caused and delivered to the CPU 12. Then, the CPU 12 runs a window-manager program or application of the X window system so as to cause a sequence of operations of deleting data representing the pull-down menu form, which is stored in the memory 2, and filling up a rectangular empty space in the pattern stored in the memory 34. In case of relatively slow operations of, for instance, moving, resizing, creating or destroying a window in response to a user's manual manipulation of the mouse, the time-sharing/multi-tasking OS can barely follow such operations in real time.

However, in case of the application of multi-media, special-effect functions such as an automatic zooming (namely, the function of performing automatic repetitions of zooming-in on/zooming-out from a part of a scene) and a spinning function (namely, the function of performing rotations of a part of a scene around a vertical axis and around a horizontal axis) are greatly demanded in addition to the function of displaying a video image of a fixed-shape like an ordinary television set in order to make an extremely effective impression on a viewer. Further, it is necessary for achieving such special effects to change the contents of the key plane 34 in real time. Inconveniently, in case of employing the time-sharing/multi-tasking OS for processing many tasks concurrently, the CPU 12 cannot be dedicated to the rewriting of the contents of the key plane 34. Thus, if the number of tasks to be performed increases, for example, the automatic zooming cannot be effected smoothly. Unfavorably, the automatic zooming becomes performed discontinuously.

The present invention is created to resolve such a problem of the conventional dynamic-image displaying workstation.

It is, accordingly, an object of the present invention to provide a dynamic-image displaying workstation which operates under the control of a non-real-time OS and can display a video dynamic-image by using multiple windows and perform real-time special-effect functions.

SUMMARY OF THE INVENTION

Figure 1:
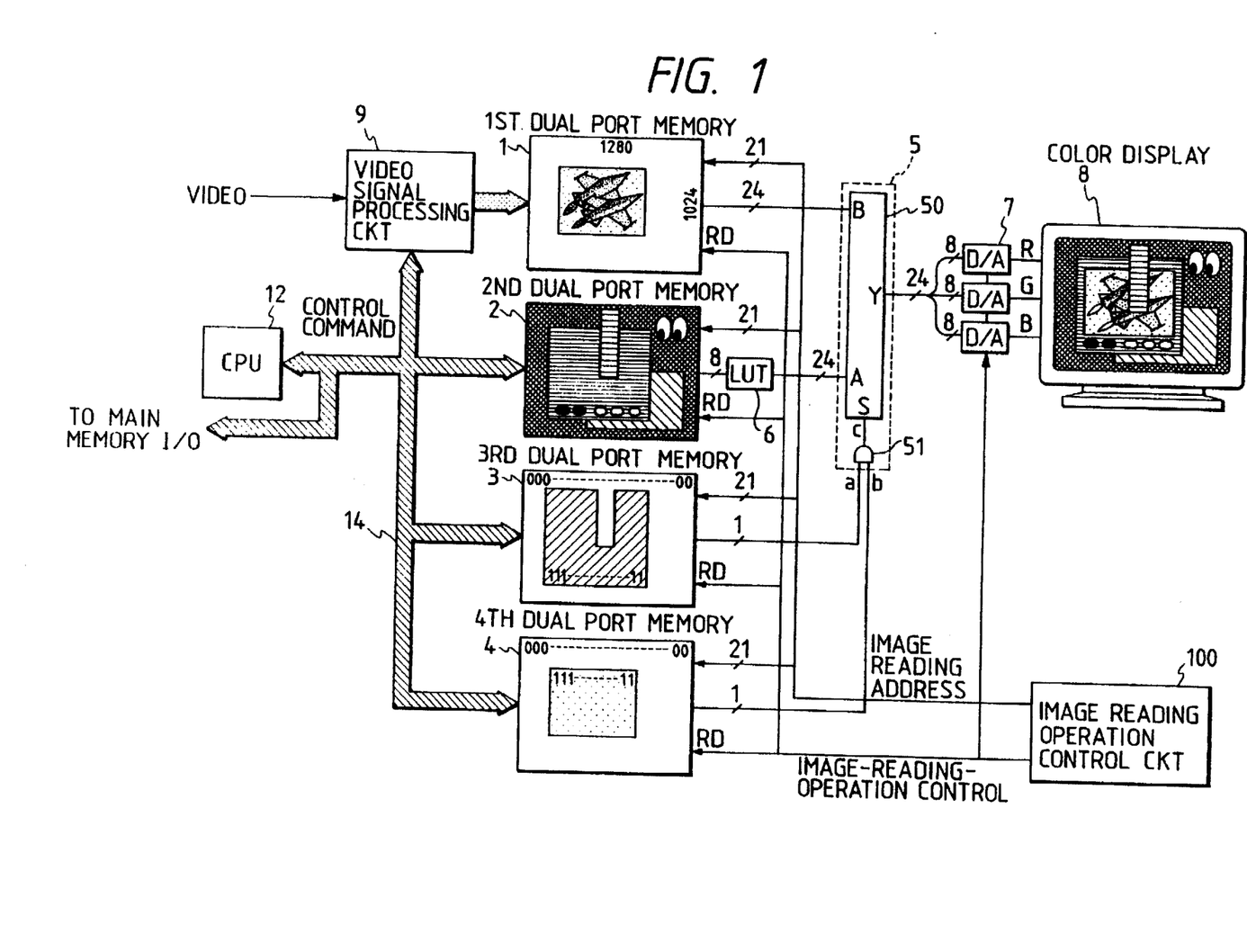
FIG. 1 is a schematic block diagram for illustrating the configuration of a first embodiment of (namely, a first dynamic-image displaying workstation embodying) the present invention.

To achieve the foregoing object and in accordance with the present invention, there is provided a dynamic-image displaying workstation in which a key plane is divided into two independent planes (for example, third and fourth planes 3 and 4 as illustrated in FIG. 1). Namely, one of the two planes is called a window-area plane which is used to write data representing a pattern of a window area. The window area is defined herein as an area of a window, to which a video dynamic-image belongs, and is not covered by any other windows. Further, the other of the two planes is called a dynamic-image area plane which is used to write data representing a pattern of a dynamic-image-display effective area thereto. The dynamic-image display effective area is defined herein as an area of the video dynamic-image, which is originally intended to be shown to a viewer. A part of the video dynamic-image corresponding to the result of the logical AND between the data representing the patterns respectively written to the window-area plane and the dynamic-image area plane is displayed on the screen of a display device of the workstation.

Incidentally, only when a request for changing the window area is caused, data representing a pattern of a window area is written to the window-area plane by a processor (including the CPU), which processes the request (namely, runs a window-manager program). In contrast with this, data representing a pattern of a dynamic-image-display effective area is written to the dynamic-image area plane (at a relatively high speed) by a processor for running a dynamic-image area control program in real time independently of change in the window area. The logical AND between the data representing the patterns respectively written to the window-area plane and the dynamic-image area plane is automatically carried out by hardware. Thus the problem of the conventional workstation (namely, special-effect functions such as the automatic zooming are effected discontinuously) can be resolved. Thereby, even in case where a workstation operates under the control of a non-real-time time-sharing/multi-tasking OS, a video dynamic-image can be displayed by using multiple windows and performing real-time special-effect functions. Consequently, the dynamic-image displaying workstation of the present invention has outstanding merits in the application of multi-media using a dynamic image.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

1. First Embodiment

Hereinafter, the first embodiment of the present invention will be described in detail by referring to the drawings.

FIG. 1 is a schematic block diagram for illustrating the configuration of the first embodiment of (namely, the first dynamic-image displaying workstation embodying) the present invention. In this figure, reference numerals 1 and 2 designate first and second dual port memories; 5 a data selector; 6 a color lookup table (device); 7 a D/A converter; 8 a color display; 9 a video signal processing circuit; 12 a CPU; 14 a first data bus; 50 a multiplexer; and 100 an image-reading-operation control device for outputting an image-data reading control signal and an image-data reading address signal. These composing elements have the same functions as the corresponding elements of the conventional workstation indicated by like reference numerals in FIG. 9 do. Namely, the CPU 12 of this workstation runs UNIX, which is a time-sharing/multi-tasking OS, and the X window system, which is a multiple-window system. Further, the CPU 12 receives data from and sends data to a main memory and I/O devices such as a hard disk through the data bus 14. Dual port memories 1, 2, 3 and 4 have functions similar to functions of a conventional graphic frame memories, each of which usually consists of a VRAM. Furthermore, data can be read from and written to a first port (namely, a left port as viewed in this figure) of each of the memories 1, 2, 3 and 4. Moreover, data can be read from a second port (namely, a right port as viewed in this figure) of each of the memories 1, 2, 3 and 4. The numbers of pixels displayed horizontally and vertically on a display device of the workstation (namely, the resolution of the display device thereof) are 1280 and 1024, respectively. The memories (hereunder sometimes referred to as the buffers) 1, 2, 3 and 4 store 24-bit data, 8-bit data, 1-bit data and 1-bit data corresponding to each pixel, respectively. Analog data represented by video signals (more particularly, NTSC composite video signals in case of this embodiment) inputted from an external device are converted by the video-signal processing circuit 9 into digital data. Then, a predetermined processing is further performed therein and data corresponding to one field of a video image is outputted therefrom every (1/60) seconds. The CPU 12 sets control commands describing the contents of the information on various processing to be performed on video signals. The contents of the information are, for example, positions on the screen of an external display device, which define an original picture including a video dynamic-image to be inputted to the workstation, the size of the input image, scaling parameters or factor, positions on the screen of a display device of the workstation, which define the video dynamic-image, the size of the video dynamic-image and contrast/luminance control parameters. The video signal processing circuit 9 writes data representing the video dynamic-image to the dual port memory 1 from the first port thereof and controls the data. For simplicity of description, a video dynamic image of jet planes having 640 pixels in the horizontal direction and 480 pixels in the vertical direction is pictorially illustrated in the dual port memory 1 of FIG. 1. Further, data representing characters and graphic forms as shown in the screen of the display of the workstation is written by the CPU 12 to the second dual port memory 2. The color lookup table 8 inputs 8-bit output data read from the memory 2, which indicates one of 256 kinds of colors, and immediately converts the 8-bit data inputted thereto into 24-bit color data, in which three groups of 8 bits represent red (R), green (G) and blue (B) data, and outputs the 24-bit color data. Moreover, a value of 1 is written to the address of the third dual port memory 3 corresponding to each pixel of a window area as defined previously. Furthermore, a value of 0 is written to the other addresses of the memory 3. For convenience of description, this dual port memory 3 will be referred to as a window-area plane hereinbelow. Further, a value of 1 is written to the address of the fourth dual port memory 4 corresponding to each pixel of a dynamic-image display effective area corresponding to the video dynamic-image stored in the first dual memory 1. Incidentally, the dynamic-image display effective area is an area or part, which is intended to be shown to a viewer or utilized, of a dynamic image regardless of the form of the window, to which the dynamic image belongs, and of the overlapping of the windows, as stated previously. Furthermore, a value of 0 is written to the other addresses of the memory 4. For convenience of description, this dual port memory 4 will be referred to as a dynamic-image area plane hereunder. The data selector 5 practically consists of the multiplexer 50 and an AND gate circuit 51, which selects output data of the memory 1 if both of input data a and b are 1, and otherwise selects output data of the memory 2, and outputs the selected data. A signal representing output data of the data selector 5 is converted by the D/A converter 7 into an analog RGB video signal, from which a color image is then displayed on the screen of the color display 8 having the resolution of 1280 ×1024 pixels. If an image-data reading control signal and an image-data reading address signal, which are synchronized with the video signal sent to the color display 8, are supplied from the device 100 to the D/A converter 7 and the second port of each of the memories 1, 2, 3 and 4, respectively, the data selector 5 makes video dynamic-image data pass therethrough when data corresponding to pixels of an area or part obtained as the result of the logical AND between the data representing the window area stored in the window-area plane 3 and the data representing the dynamic-image area stored in the dynamic-image area plane 4. Thus, as illustrated in FIG. 1, a video dynamic-image (in this case, a dynamic image of jet planes) can be displayed in a window of the multiple-window, to which the dynamic image belongs, on the screen of the color display 8 of this figure.

Figure 8A:
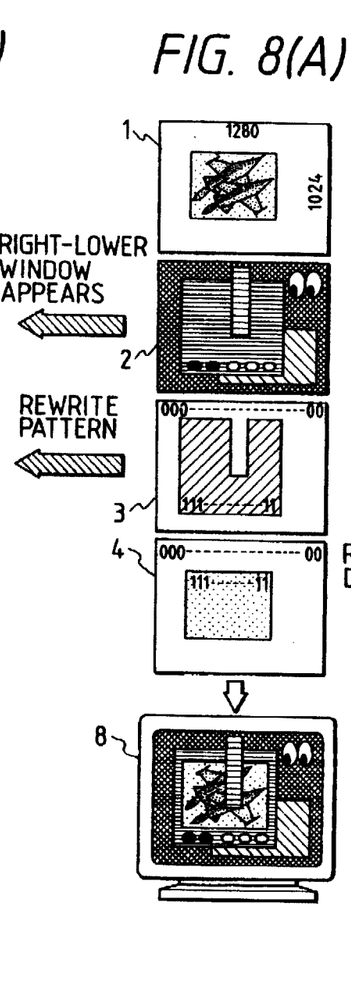
FIGS. 8(A), 8(B) and 8(C) are diagrams for illustrating an operating principle of an embodiment of the present invention.
Figure 8B:
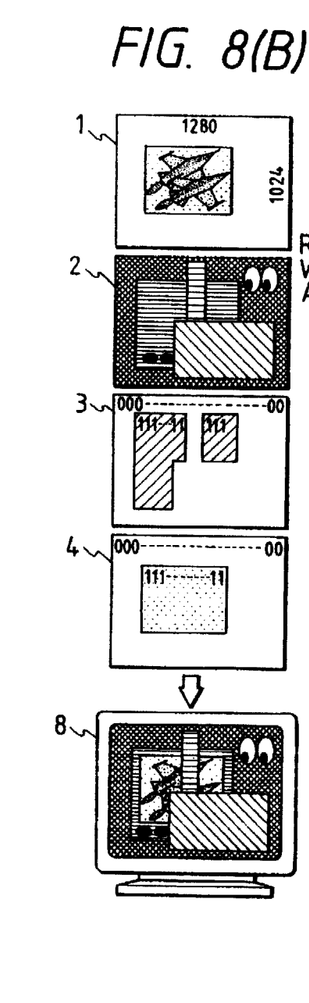
Figure 8C:
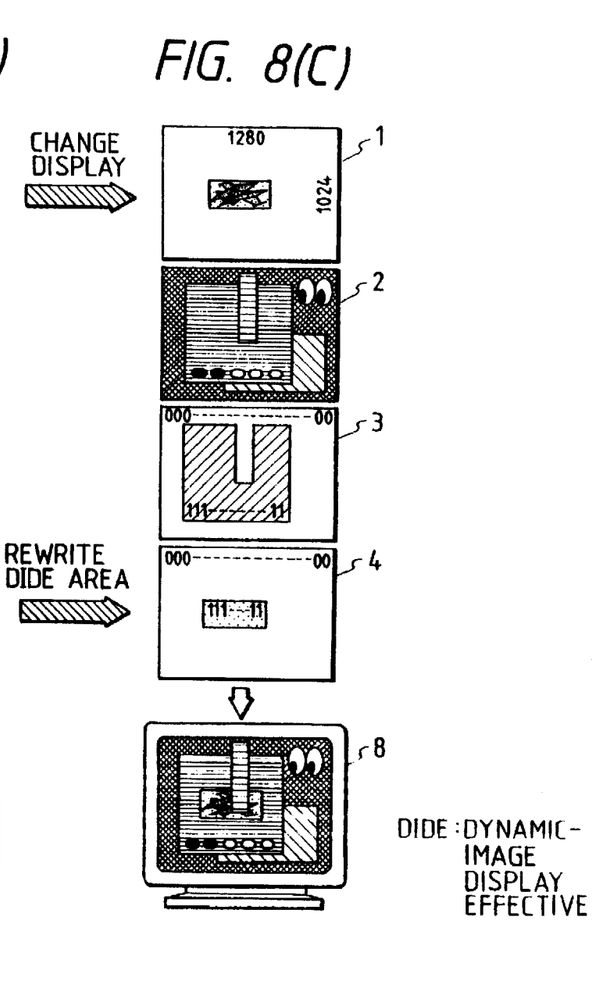

Hereinafter, it will be described in detail by referring to FIG. 8 how to utilize the bit patterns of the window area of the window-area plane 3 and of the dynamic-image display effective area of the dynamic-image are plane 4. FIG. 8(A) shows an initial or original state of each of the dual port memories 1, 2, 3 and 4. First, if the window indicated by leftwardly descending oblique lines in the lower right part of the box corresponding to the memory 2 of FIG. 8(A) is enlarged in the foreground by manipulating a mouse or the like as illustrated in FIG. 8(B), a part of the window area shown in the box corresponding to the memory 3 of FIG. 8(A) covered by the enlarged part of the window is deleted as illustrated in the box corresponding to the memory 3 of FIG. 8(B). Even if there is no change in the dynamic-image display effective area of the memory 4 of FIGS. 8(A) and 8(B), the logical AND between the Window area and the dynamic-image effective area is automatically performed. This results in that the video dynamic-image can be correctly displayed in the color display 8. Next, when an automatic zooming is being performed (in this case, the contraction and expansion of the dynamic image of the jet planes are repeatedly effected) as illustrated in FIG. 8(C), the dynamic image changes in form or contour and so on (namely, the dynamic image of the box corresponding to the memory 1 of FIG. 8(C) contracts and expands repeatedly) in real time every (1/60) seconds at a maximum rate in response to an updating of control commands supplied to the video signal processing circuit 9. In response to such real-time change in form or contour of the dynamic image, the contents of the dynamic-image display effective area are rewritten momentarily as is shown in the box of the memory 4 of FIG. (C). Thus, even when there is no change in the window area (as shown in the box corresponding to the memory 3 of FIG. 8(C)), as a result of automatically effecting the logical AND between the window area and the dynamic-image display effective area, the dynamic image automatically zoomed in real time can be correctly displayed on the screen of the display of the workstation.

2. Second Embodiment

Hereinafter, the second embodiment of the present invention will be described in detail by referring to the drawings.

Figure 2:
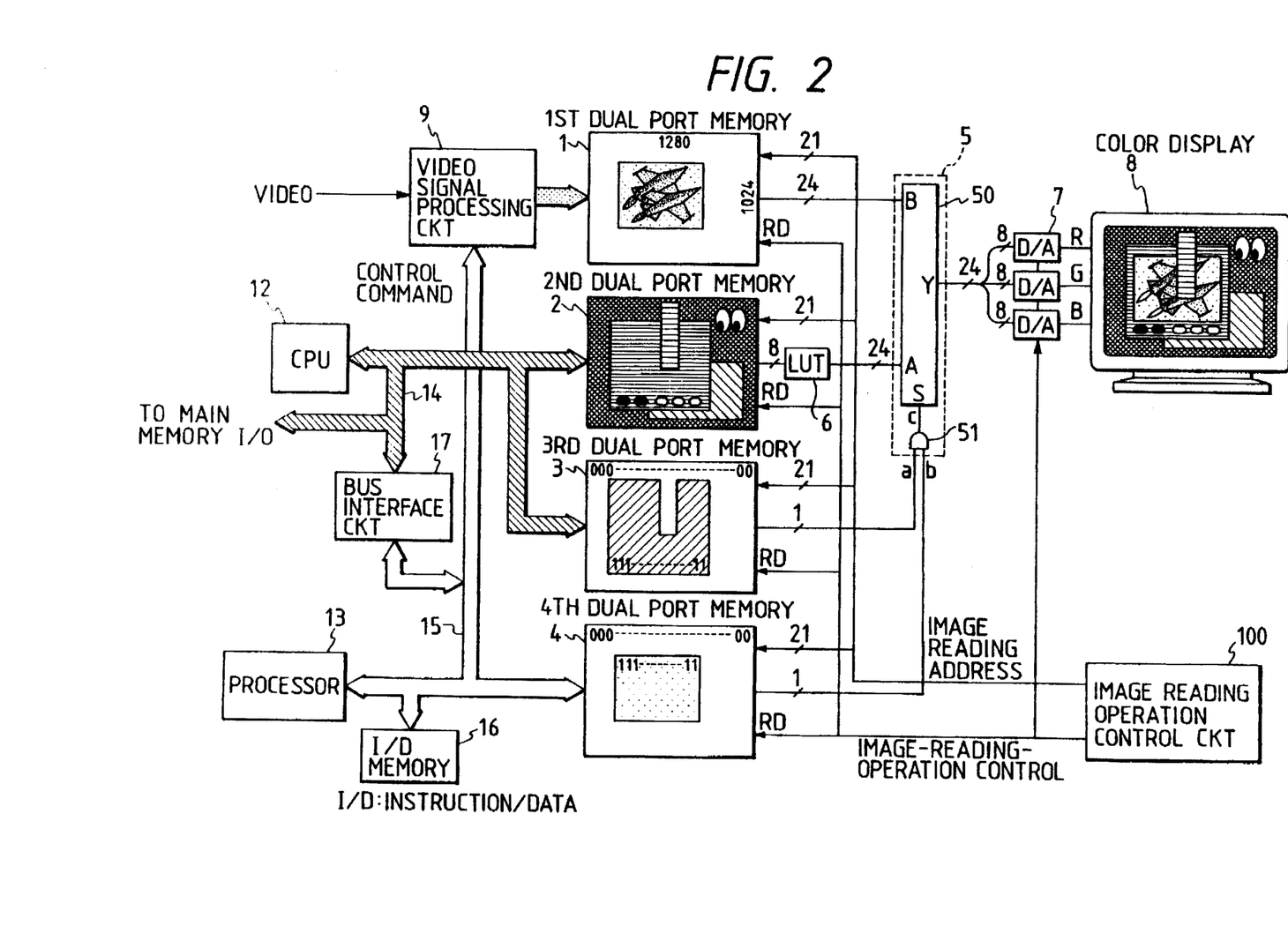
FIG. 2 is a schematic block diagram for illustrating the configuration of a second embodiment of (namely, a second dynamic-image displaying workstation embodying) the present invention.

FIG. 2 is a schematic block diagram for illustrating the configuration of the second embodiment of (namely, the second dynamic-image displaying workstation embodying) the present invention. In this figure, reference numerals 1, 2, 3 and 4 designate first, second, third and fourth dual port memories; 5 a data selector; 6 a color lookup table (device); 7 a D/A converter; 8 a color display; 9 a video signal processing circuit; 12 a CPU; 14 a first data bus; 50 a multiplexer; 51 an AND gate circuit; and 100 an image-reading-operation control device for outputting an image-data reading control signal and an image-data reading address signal. These composing elements have the same functions as the corresponding elements of the first dynamic-image displaying workstation indicated by like reference numerals in FIG. 1 do. Namely, the CPU 12 of this workstation runs UNIX, which is a time-sharing/multi-tasking OS, and the X window system, which is a multiple-window system. Further, reference numeral 13 denotes a processor for executing an instruction down-loaded by the CPU 12 to an instruction/data memory 16 independently of the CPU 12. Reference numeral 15 designates a second data bus, through which the processor 13 sets a control command (namely, the contents of a processing to be performed on a video signal) in the video signal processing circuit 9 and writes data representing a dynamic-image display effective area to the fourth dual port memory 4. Further, reference numeral 17 represents a bus interface circuit. When the CPU releases the second data bus 15, the CPU 12 can access data on the second data bus 15 through the first data bus 14 and the bus interface circuit 17 by issuing a request to the circuit 17. In case of this embodiment, this bus interface circuit 17 is used when the CPU downloads instructions and data prepared for the processor 13 to the instruction/data memory 16. The video signal processing circuit 9 writes data representing a video dynamic-image to first dual port memory 1 from the first port thereof and controls the data. Further, data representing a character or a graphic form is written by the CPU 12 to the second dual port memory 2. Moreover, data representing a window area is written by the CPU 12 to the third dual port memory 3 (namely, a window-area plane). Furthermore, data representing a dynamic-image display effective area is written by the processor 13 to the fourth dual port memory 4 (namely, a dynamic-image area plane). A part of the workstation, which includes the first to fourth dual port memories 1 to 4 and is illustrated in the right half of FIG. 2, operate in the same manner as in case of the first embodiment. Thus a video dynamic-image of jet planes, which belongs to multiple window, can be displayed on the screen of the color display 8.

Next, an operation of the other part of the workstation illustrated in the left half of FIG. 2 will be described hereinbelow. First, the CPU 12 sends a request for the acquisition of the second data bus 15 to the bus interface circuit 17 and then downloads to the instruction/data memory 16 a group of routines for generating data representing a pattern of the dynamic-image display effective area to be written to the dynamic-image area plane 4, as well as a sequence of control commands to be provided to the video signal processing circuit 9. Upon completion of the downloading, the CPU 12 releases the second data bus 15 and gives back the proprietorship of the second data bus to the processor 13. Thereafter, when a request for updating the state of the window containing the dynamic image is caused due to the phenomena that the window becomes covered by another window, or that the window is moved, the CPU 12 writes data representing new graphic forms to the second dual port memory 2 and also writes data representing a new window area to the window-area plane 3. Simultaneously, if the updating of the state of the window affects the dynamic image, the CPU 12 immediately directs the processor 13 through the bus interface circuit 17 (by, for instance, generating an interrupt) to run an appropriate processing routine. Processing to be performed by running the processing routine is, for example, to set a group of new control commands in the video signal processing circuit 9, or to write a group of new patterns of the dynamic-image effective area to the dynamic-image area plane 4.

This embodiment is characterized in that with respect to operations, which do not require a quick response, such as an interactive operation between the workstation and a user, the CPU 12 perform the updating operation by rewriting the contents of the second dual port memory 2 and of the window-area plane 3 and that on the other hand, in connection with other operations, which require quick responses and are fatally affected by delay in responding, such as real-time special-effect operation (for instance, an automatic zooming), the processor 13, which can operate independently of the CPU 12, performs the updating operation on the video signal processing circuit 9 and the dynamic-image area plane at a high speed in real time. This ensures more reliably that a special-effect operation can be performed on the dynamic image in real time.

Incidentally, the instruction/data memory 16 is connected only to the second data bus 15 as illustrated in FIG. 2. However, the present invention is not limited to such a configuration. For instance, a dual port memory connected to both of the first and second data buses 14 and 15 may be employed. In case of employing such a dual port memory, preferably, there occurs no overhead required for the acquisition of the second data bus 15.

3. Third Embodiment

Hereinafter, the third embodiment of the present invention will be described in detail by referring to the drawings.

Figure 3:
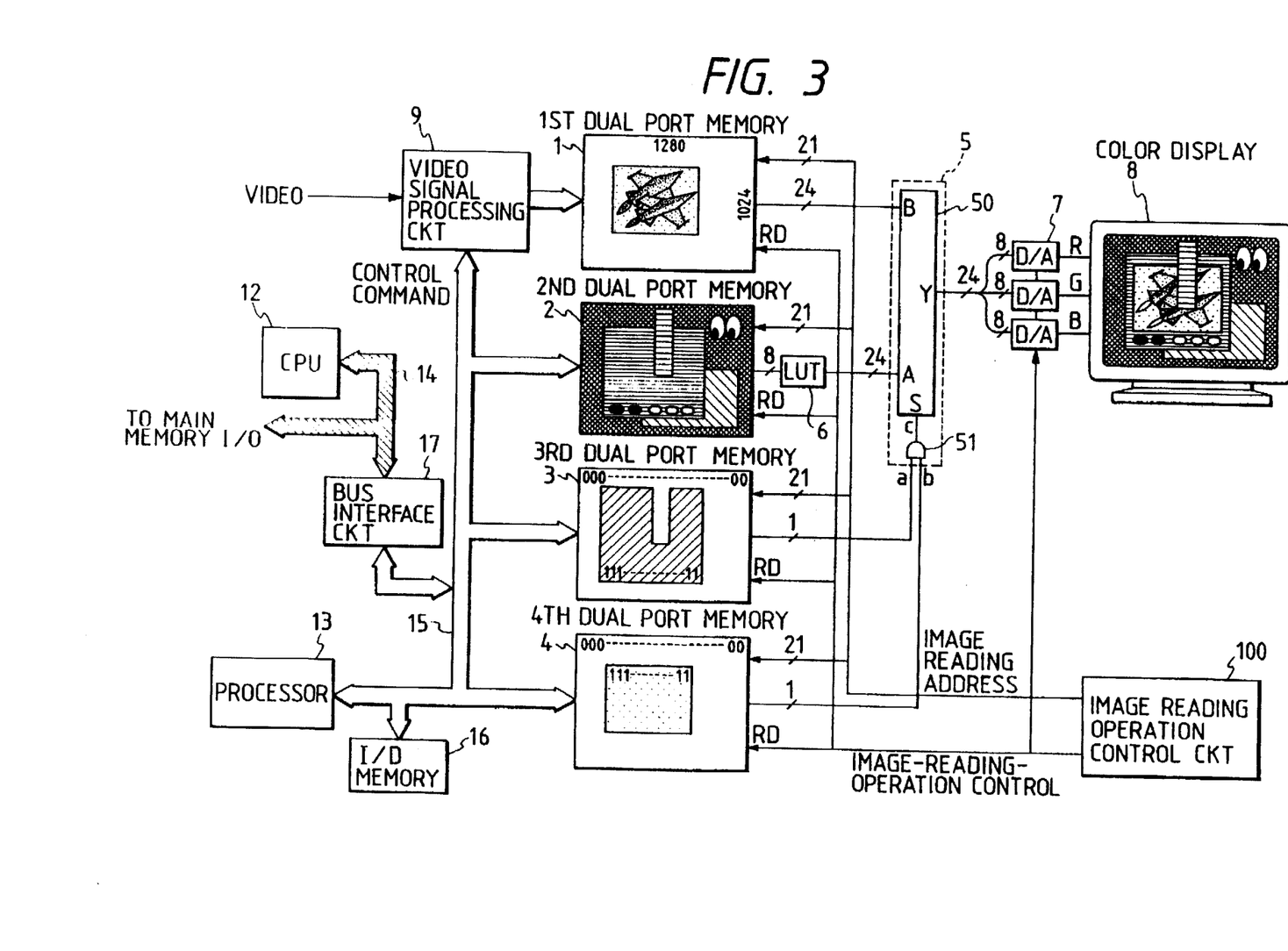
FIG. 3 is a schematic block diagram for illustrating the configuration of a third embodiment of (namely, a third dynamic-image displaying workstation embodying) the present invention.

FIG. 3 is a schematic block diagram for illustrating the configuration of the third embodiment of (namely, the third dynamic-image displaying workstation embodying) the present invention. In this figure, reference numerals 1, 2, 3 and 4 designate first, second, third and fourth dual port memories; 5 a data selector; 6 a color lookup table (device); 7 a D/A converter; 8 a color display; 9 a video signal processing circuit; 12 a CPU; 14 a first data bus; 50 a multiplexer; 51 an AND gate circuit; and 100 an image-reading-operation control device for outputting an image-data reading control signal and an image-data reading address signal. These composing elements have the same functions as the corresponding elements of the first dynamic-image displaying workstation indicated by like reference numerals in FIG. 1 do. Further, reference numeral 13 denotes a processor; 15 a second data bus; 16 an instruction/data memory; and 17 a bus interface circuit. These composing elements have the same functions as the corresponding elements of the second dynamic-image displaying workstation indicated by like reference numerals in FIG. 2 do. Namely, the CPU 12 of this workstation runs UNIX, which is a time-sharing/multi-tasking OS, and client programs (namely, application programs) of the X window system, which is a multiple-window system. The processor 13 executes an instruction down-loaded by the CPU 12 to the instruction/data memory 16 independently of the CPU 12. The processor 13 sets control commands (namely, the contents of a processing to be performed on a video signal) in the video signal processing circuit 9 and writes to the second to fourth dual port memories 2, 3 and 4 data corresponding to these memories, respectively. The video signal processing circuit 9 writes data representing a video dynamic-image to first dual port memory 1 from the first port thereof and controls the data. Further, data representing a character and a graphic form is written by the CPU 12 to the second dual port memory 2. Moreover, data representing a window area is written by the CPU 12 to the third dual port memory 3 (namely, a window-area plane). Furthermore, data representing a dynamic-image display effective area is written by the processor 13 to the fourth dual port memory 4 (namely, a dynamic-image area plane). A part of the workstation, which includes the first to fourth dual port memories 1 to 4 and is illustrated in the right half of FIG. 3, operate in the same manner as in case of the first embodiment of FIG. 1. Thus a video dynamic-image of jet planes, which belongs to multiple window, can be displayed on the screen of the color display 8.

Next, an operation of the other part of the workstation illustrated in the left half of FIG. 3 will be described hereinbelow. First, the CPU 12 preliminarily sends a request for the acquisition of the second data bus 15 to the bus interface circuit 17 and then downloads to the instruction/data memory 16 a group of routines (including a server program (for instance, a drawing routine) of the X window system) for generating data representing a graphic form and a character font to be written to the second dual port memory 2, a group of routines for generating a pattern of the window area to be written to the window-area plane 3, a group of routines for generating a pattern of the dynamic-image display effective area to be written to the dynamic-image area plane 4, and a sequence of control commands to be provided to the video signal processing circuit 9. Upon completion of the downloading, the CPU 12 releases the second data bus 15 and gives back the proprietorship of the second data bus to the processor 13. Thereafter, when a request for updating the state of the window containing the dynamic image is caused due to the phenomena that the window becomes covered by another window, or that the window is moved, the CPU 12 performs a suitable processing routine, for example, writes data representing new graphic forms to the second dual port memory 2 or writes data representing a new window area to the window-area plane 3. Further, if the updating of the state of the window affects the dynamic image, the CPU 12 immediately directs the processor 13 through the bus interface circuit 17 to set a group of new control commands in the video signal processing circuit 9 and write a group of new patterns of the dynamic-image effective area to the dynamic-image area plane at a high speed. That the processor can perform such operations at a high speed means that the processor can perform such operations continuously and straight as intended without "looking away" (namely, such operations can be prevented from being performed discontinuously).

This embodiment is characterized in that the processor 13, which can operate independently of the CPU 12 running a non-real-time OS, is made to run a server program (including a drawing routine), and perform the updating operation on the video signal processing circuit 9 and the dynamic-image area plane 4 at a high speed in real time, and write to the second dual port memory 2 data required for effecting a drawing of a graphic form, and perform the updating operation on the window-area plane 3 at a high speed in real time. This ensures more reliably that a special-effect operation can be performed on the dynamic image in real time and that a response to change in the state of the window, as well as a drawing of a graphic form, can be effected at a high speed.

Incidentally, the instruction/data memory 16 is connected only to the second data bus 15 as illustrated in FIG. 3. However, the present invention is not limited to such a configuration. For instance, a dual port memory connected to both of the first and second data buses 14 and 15 may be employed. In case of employing such a dual port memory, preferably, there occurs no overhead required for the acquisition of the second data bus 15.

4. Fourth Embodiment

Hereinafter, the fourth embodiment of the present invention will be described in detail by referring to the drawings.

Figure 4:
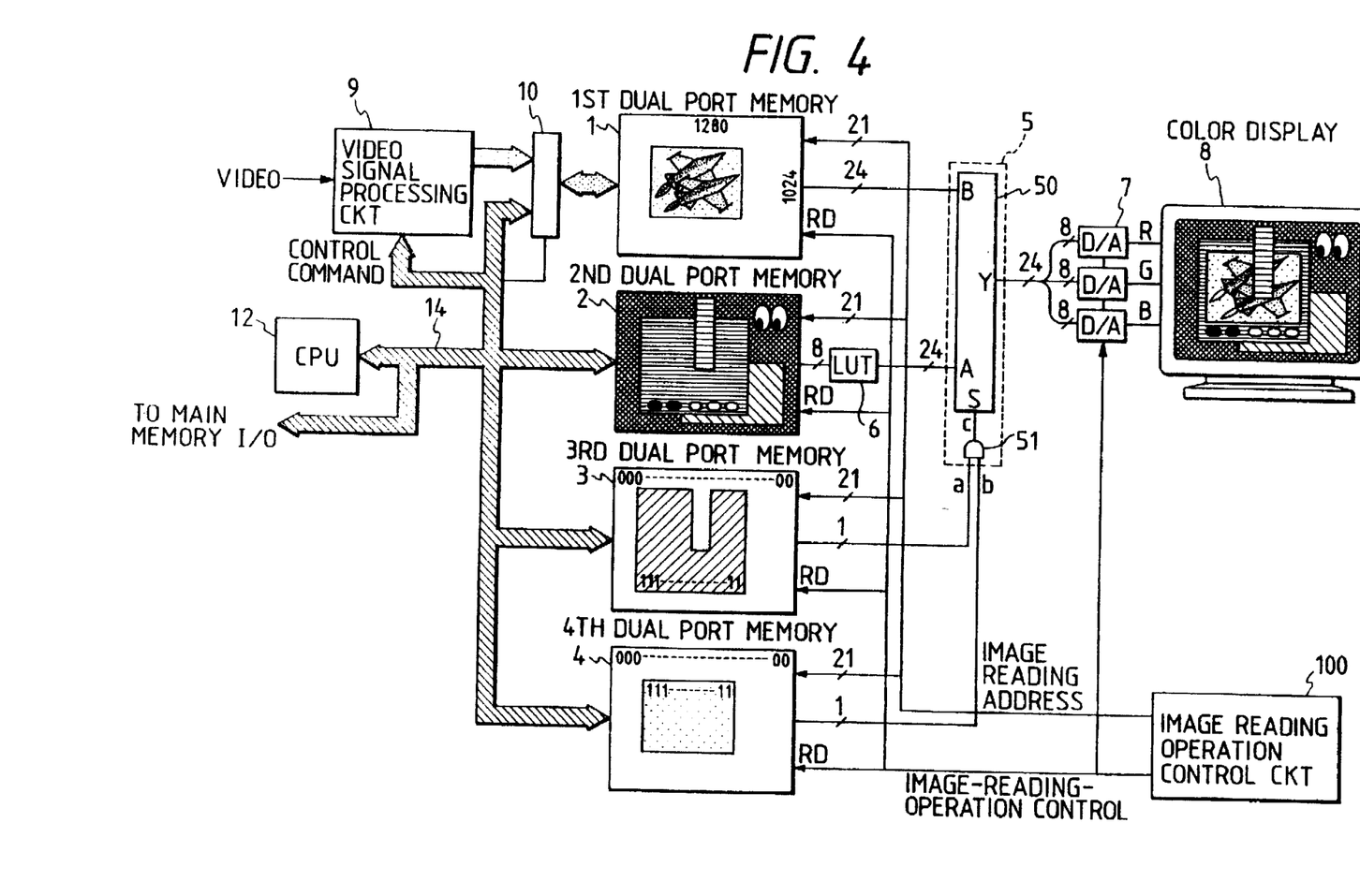
FIG. 4 is a schematic block diagram for illustrating the configuration of a fourth embodiment of (namely, a fourth dynamic-image displaying workstation embodying) the present invention.

FIG. 4 is a schematic block diagram for illustrating the configuration of the fourth embodiment of (namely, the fourth dynamic-image displaying workstation embodying) the present invention. In this figure, reference numerals 1, 2, 3 and 4 designate first, second, third and fourth dual port memories; 5 a data selector; 6 a color lookup table (device); 7 a D/A converter; 8 a color display; 9 a video signal processing circuit; 12 a CPU; 14 a first data bus; 50 a multiplexer; 51 an AND gate circuit; and 100 an image-reading-operation control device for outputting an image-data reading control signal and an image-data reading address signal. These composing elements have the same functions as the corresponding elements of the first dynamic-image displaying workstation indicated by like reference numerals in FIG. 1 do. Further, reference numeral 10 denotes a read/write control circuit, which is usually set to input dynamic-images data processed by and continually outputted from the video signal processing circuit 9 and to continually write the input dynamic-image data to the first dual port memory 1. Further, when the CPU 12 intends to read and process the video dynamic-image stored in the first dual port memory 1 as a static image, the CPU 12 changes the conditions set in the circuit 10 in such a manner to be able to read and write the data stored in the first dual port memory 1 through the first data bus 14. Moreover, the video signal processing circuit 9 of FIG. 4 is different from that of FIG. 1 in that the latter circuit 9 directly writes data representing a video dynamic-image to the first dual port memory 1, while the former circuit 9 does not do that but outputs pixel address information on addresses corresponding to locations of the memory 1, to which data corresponding to pixels of the video dynamic image is written, as well as the data representing the video dynamic-image. When receiving the pixel address information, the read/write control circuit 10 carries out a writing operation appropriately. The CPU 12 of this workstation runs UNIX, which is a time-sharing/multi-tasking OS, and the X window system, which is a multiple-window system. The video signal processing circuit 9 writes data representing a video dynamic-image to first dual port memory 1 from the first port thereof and controls the data.

In case of this embodiment, the key plane for displaying and controlling a dynamic image is divided into the window-area plane, which is written and updated only when the state of the window is changed, and a dynamic-image area plane which can be written and updated in real time completely irrespectively of change in the state of the window. Thereby, similarly as in case of the first embodiment, even in case where a workstation operates under the control of a non-real-time time-sharing/multi-tasking OS, a video dynamic-image can be displayed by using multiple window and performing real-time special-effect functions very smoothly.

This embodiment is characterized in that the read/write control circuit 10 is provided in the workstation and thereby, the dynamic-image data stored in the first dual port memory 1 can be accessed by the CPU 12 when the dynamic image represented by the dynamic-image data, which is usually made to move continually, is stopped (namely, freezed) and is utilized as a static image. Consequently, this dynamic-image displaying workstation has outstanding merits in the application of multi-media using a dynamic image.

5. Fifth Embodiment

Hereinafter, the fifth embodiment of the present invention will be described in detail by referring to the drawings.

Figure 5:
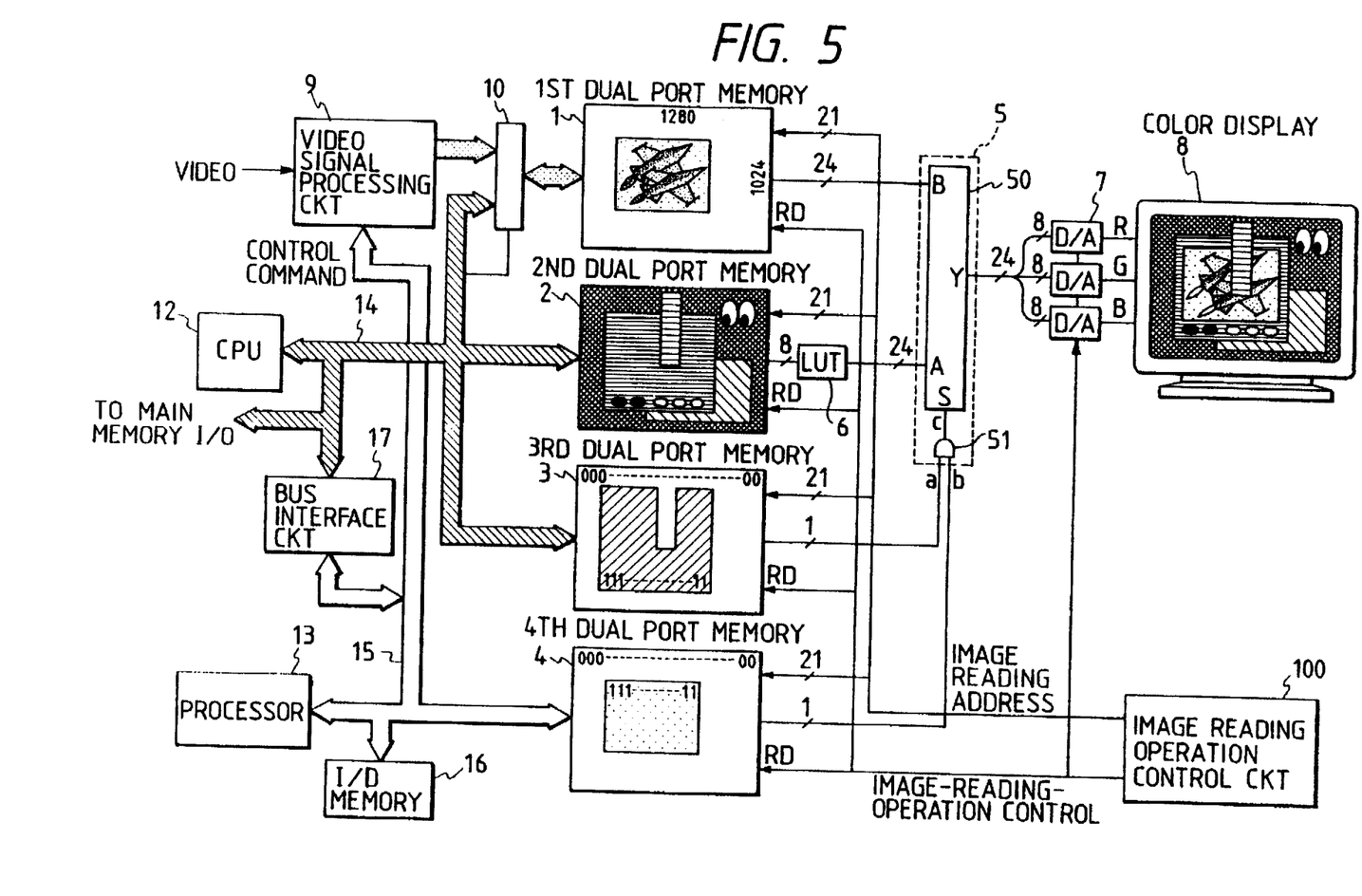
FIG. 5 is a schematic block diagram for illustrating the configuration of a fifth embodiment of (namely, a fifth dynamic-image displaying workstation embodying) the present invention.

FIG. 5 is a schematic block diagram for illustrating the configuration of the fifth embodiment of (namely, the fifth dynamic-image displaying workstation embodying) the present invention. In this figure, reference numerals 1, 2, 3 and 4 designate first, second, third and fourth dual port memories; 5 a data selector; 6 a color lookup table (device); 7 a D/A converter; 8 a color display; 9 a video signal processing circuit; 12 a CPU; 14 a first data bus; 50 a multiplexer; 51 an AND gate circuit; and 100 an image-reading-operation control device for outputting an image-data reading control signal and an image-data reading address signal. These composing elements have the same functions as the corresponding elements of the first dynamic-image displaying workstation indicated by like reference numerals in FIG. 1 do. Further, reference numeral 13 denotes a processor; 15 a second data bus; 16 an instruction/data memory; and 17 a bus interface circuit. These composing elements have the same functions as the corresponding elements of the second dynamic-image displaying workstation indicated by like reference numerals in FIG. 2 do. Moreover, reference numeral 10 denotes a read/write control circuit which has the same function as the circuit 10 of the fourth embodiment of FIG. 4. The CPU 12 of this workstation runs UNIX, which is a time-sharing/multi-tasking OS, and the X window system, which is a multiple-window system. The processor 13 can execute an instruction down-loaded by the CPU 12 to the instruction/data memory 16 independently of the CPU 12. The read/write control circuit 10, which is usually set to input dynamic-image data processed by and continually outputted from the video signal processing circuit 9 and to continually write the input dynamic-image data to the first dual port memory 1. Further, data representing a character and a graphic form is written by the CPU 12 to the second dual port memory 2. Moreover, data representing a window area is written by the CPU 12 to the third dual port memory 3 (namely, a window-area plane). Furthermore, data representing a dynamic-image display effective area is written by the processor 13 to the fourth dual port memory 4 (namely, a dynamic-image area plane). A part of the workstation, which includes the first to fourth dual port memories 1 to 4 and is illustrated in the right half of FIG. 5, operate in the same manner as in case of the first embodiment of FIG. 1. Thus a video dynamic-image of jet planes, which belongs to multiple window, can be displayed on the screen of the color display 8.

Next, an operation of the other part of the workstation illustrated in the left half of FIG. 5 will be described hereinbelow. First, the CPU 12 sends a request for the acquisition of the second data bus 15 to the bus interface circuit 17 and then downloads to the instruction/data memory 16 a group of routines for generating data representing a pattern of the dynamic-image display effective area to be written to the dynamic-image area plane 4, as well as a sequence of control commands to be provided to the video signal processing circuit 9. Upon completion of the downloading, the CPU 12 releases the second data bus 15 and gives back the proprietorship of the second data bus to the processor 13. Thereafter, when a request for updating the state of the window containing the dynamic image is caused due to the phenomena that the window becomes covered by another window, or that the window is moved, the CPU 12 writes data representing new graphic forms to the second dual port memory 2 and also writes data representing a new window area to the window-area plane 3. Simultaneously, if the updating of the state of the window affects the dynamic image, the CPU 12 immediately directs the processor 13 through the bus interface circuit 17 (by, for instance, generating an interrupt) to run an appropriate processing routine. Processing to be performed by running the processing routine is, for example, to set a group of new control commands in the video signal processing circuit 9, or to write a group of new patterns of the dynamic-image effective area to the dynamic-image area plane 4.

This embodiment is characterized in that with respect to operations which do not require a quick response, such as an interactive operation between the workstation and a user, the CPU 12 perform the updating operation by rewriting the contents of the second dual port memory 2 and of the window-area plane 3 and that on the other hand, in connection with other operations, which require quick responses and are fatally affected by delay in responding, such as real-time special-effect operation (for instance, an automatic zooming), the processor 13, which can operate independently of the CPU 12, performs the updating operation on the video signal processing circuit 9 and the dynamic-image area plane at a high speed in real time. This ensures more reliably that a special-effect operation can be performed on the dynamic image in real time. This embodiment is further characterized in that the read/write control circuit 10 is provided in the workstation and thereby, the dynamic-image data stored in the first dual port memory 1 can be accessed by the CPU 12 when the dynamic image represented by the dynamic-image data, which is usually made to move continually, is stopped (namely, freezed) and is utilized as a static image. Consequently, this dynamic-image displaying workstation has outstanding merits in the application of multi-media using a dynamic image.

Incidentally, the instruction/data memory 16 is connected only to the second data bus 15 as illustrated in FIG. 5. However, the present invention is not limited to such a configuration. For instance, a dual port memory connected to both of the first and second data buses 14 and 15 may be employed. In case of employing such a dual port memory, preferably, there occurs no overhead required for the acquisition of the second data bus 15.

6. Sixth Embodiment

Hereinafter, the sixth embodiment of the present invention will be described in detail by referring to the drawings.

Figure 6:
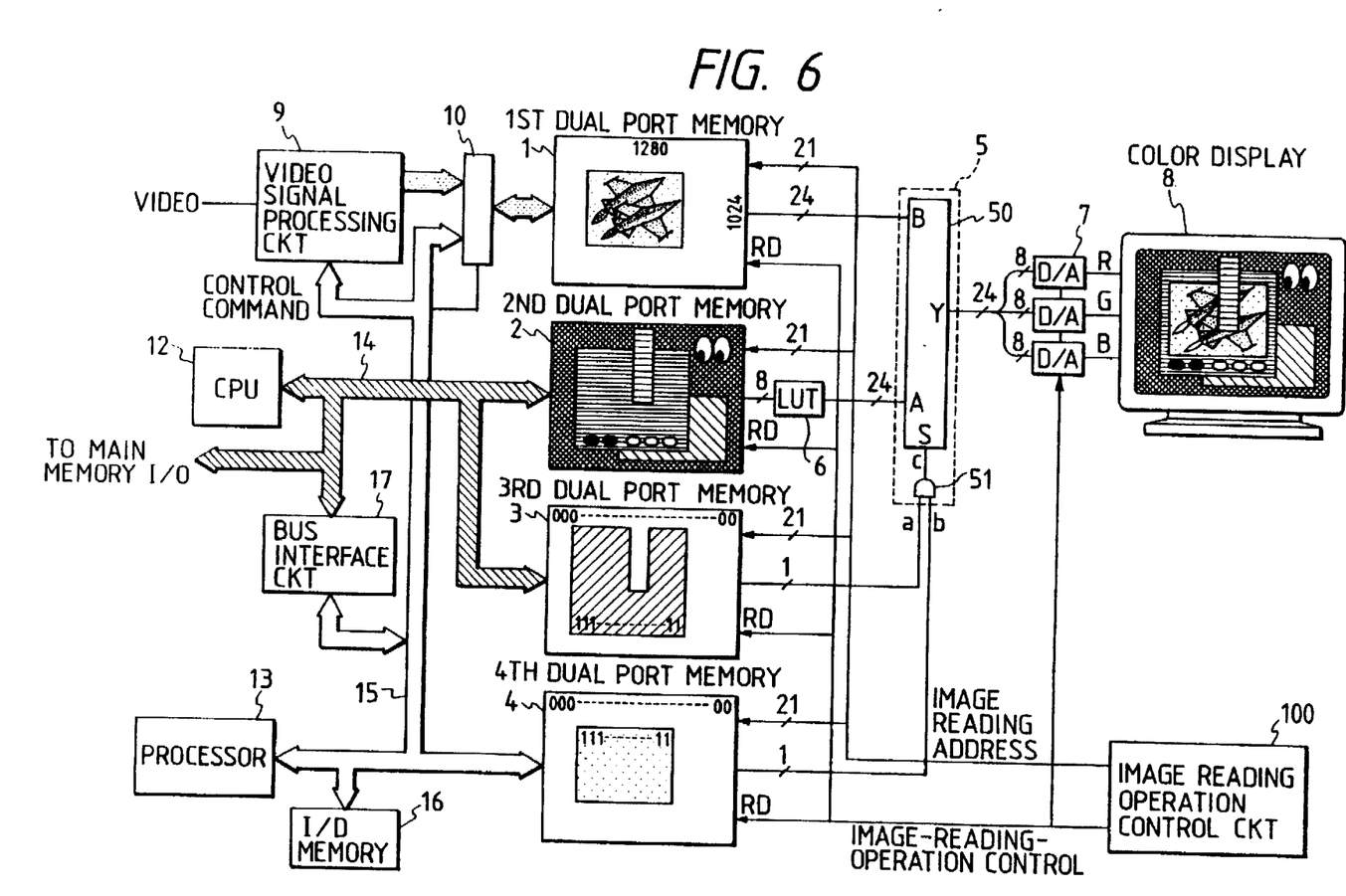
FIG. 6 is a schematic block diagram for illustrating the configuration of a sixth embodiment of (namely, a sixth dynamic-image displaying workstation embodying) the present invention.

FIG. 6 is a schematic block diagram for illustrating the configuration of the sixth embodiment of (namely, the sixth dynamic-image displaying workstation embodying) the present invention. In this figure, reference numerals 1, 2, 3 and 4 designate first, second, third and fourth dual port memories; 5 a data selector; 6 a color lookup table (device); 7 a D/A converter; 8 a color display; 9 a video signal processing circuit; 12 a CPU; 14 a first data bus; 50 a multiplexer; 51 an AND gate circuit; and 100 an image-reading-operation control device for outputting an image-data reading control signal and an image-data reading address signal. These composing elements have the same functions as the corresponding elements of the first dynamic-image displaying workstation indicated by like reference numerals in FIG. 1 do. Further, reference numeral 13 denotes a processor; 15 a second data bus; 16 an instruction/data memory; and 17 a bus interface circuit. These composing elements have the same functions as the corresponding elements of the second dynamic-image displaying workstation indicated by like reference numerals in FIG. 2 do. Moreover, reference numeral 10 denotes a read/write control circuit which has the same function as the circuit 10 of the fourth embodiment of FIG. 4, but is connected to the second data bus 15 and thus the processor 13 can read dynamic-image data written to the first dual port memory 1 and write the dynamic-image data thereto. The CPU 12 of this workstation runs UNIX, which is a time-sharing/multi-tasking OS, and the X window system, which is a multiple-window system. The processor 13 can execute an instruction down-loaded by the CPU 12 to the instruction/data memory 16 independently of the CPU 12. The read/write control circuit 10, which is usually set to input dynamic-image data processed by and continually outputted from the video signal processing circuit 9 and to continually write the input dynamic-image data to the first dual port memory 1. Further, data representing a character and a graphic form is written by the CPU 12 to the second dual port memory 2. Moreover, data representing a window area is written by the CPU 12 to the third dual port memory 3 (namely, a window-area plane). Furthermore, data representing a dynamic-image display effective area is written by the processor 13 to the fourth dual port memory 4 (namely, a dynamic-image area plane). A part of the workstation, which includes the first to fourth dual port memories 1 to 4 and is illustrated in the right half of FIG. 6, operate in the same manner as in case of the first embodiment of FIG. 1. Thus a video dynamic-image of jet planes, which belongs to multiple window, can be displayed on the screen of the color display 8.

Next, an operation of the other part of the workstation illustrated in the left half of FIG. 6 will be described hereinbelow. First, the CPU 12 sends a request for the acquisition of the second data bus 15 to the bus interface circuit 17 and then downloads to the instruction/data memory 16 a group of routines for generating data representing a pattern of the dynamic-image display effective area to be written to the dynamic-image area plane 4, a sequence of control commands to be provided to the video signal processing circuit 9, and a group of routines for changing the conditions set in the read/write control circuit 10 and transferring, processing and storing data representing a freezed static image stored in the first dual port memory 1. Upon completion of the downloading, the CPU 12 releases the second data bus 15 and gives back the proprietorship of the second data bus to the processor 13. Thereafter, when a request for updating the state of the window containing the dynamic image is caused due to the phenomena that the window becomes covered by another window, or that the window is moved, the CPU 12 writes data representing new graphic forms to the second dual port memory 2 and also writes data representing a new window area to the window-area plane 3. Simultaneously, if the updating of the state of the window affects the dynamic image, the CPU 12 immediately directs the processor 13 through the bus interface circuit 17 (by, for instance, generating an interrupt) to run an appropriate processing routine. Processing to be performed by running the processing routine is, for example, to set a group of new control commands in the video signal processing circuit 9, or to write a group of new patterns of the dynamic-image effective area to the dynamic-image area plane 4.

This embodiment is characterized in that with regard to operations, which do not require a quick response, such as an interactive operation between the workstation and a user, the CPU 12 perform the updating operation by rewriting the contents of the second dual port memory 2 and of the window-area plane 3 and that on the other hand, in connection with other operations, which require quick responses and are fatally affected by delay in responding, such as real-time special-effect operation (for instance, an automatic zooming), the processor 13, which can operate independently of the CPU 12, performs the updating operation on the video signal processing circuit 9 and the dynamic-image area plane at a high speed in real time. This ensures more reliably that a special-effect operation can be performed on the dynamic image in real time. This embodiment is further characterized in that the read/write control circuit 10 is provided in the workstation and thereby, the dynamic-image data stored in the first dual port memory 1 can be accessed by the processor 13 when the dynamic image represented by the dynamic-image data, which is usually made to move continually, is stopped (namely, freezed) at a given moment and is utilized as a static image. Consequently, this dynamic-image displaying workstation has outstanding merits in the application of multi-media using a dynamic image, for example, in case where a video dynamic-image taken by a video camera is sampled and recognized every 0.5 seconds (or every second) and the execution of a special processing routine for, for instance, issuing a predetermined message or a warning sound is started when an image meeting a predetermined condition, for instance, an image of a red object occupying nearly the entire screen of the display is received.

Incidentally, the instruction/data memory 16 is connected only to the second data bus 15 as illustrated in FIG. 6. However, the present invention is not limited to such a configuration. For instance, a dual port memory connected to both of the first and second data buses 14 and 15 may be employed. In case of employing such a dual port memory, preferably, there occurs no overhead required for the acquisition of the second data bus 15.

7. Seventh Embodiment

Hereinafter, the seventh embodiment of the present invention will be described in detail by referring to the drawings.

Figure 7:
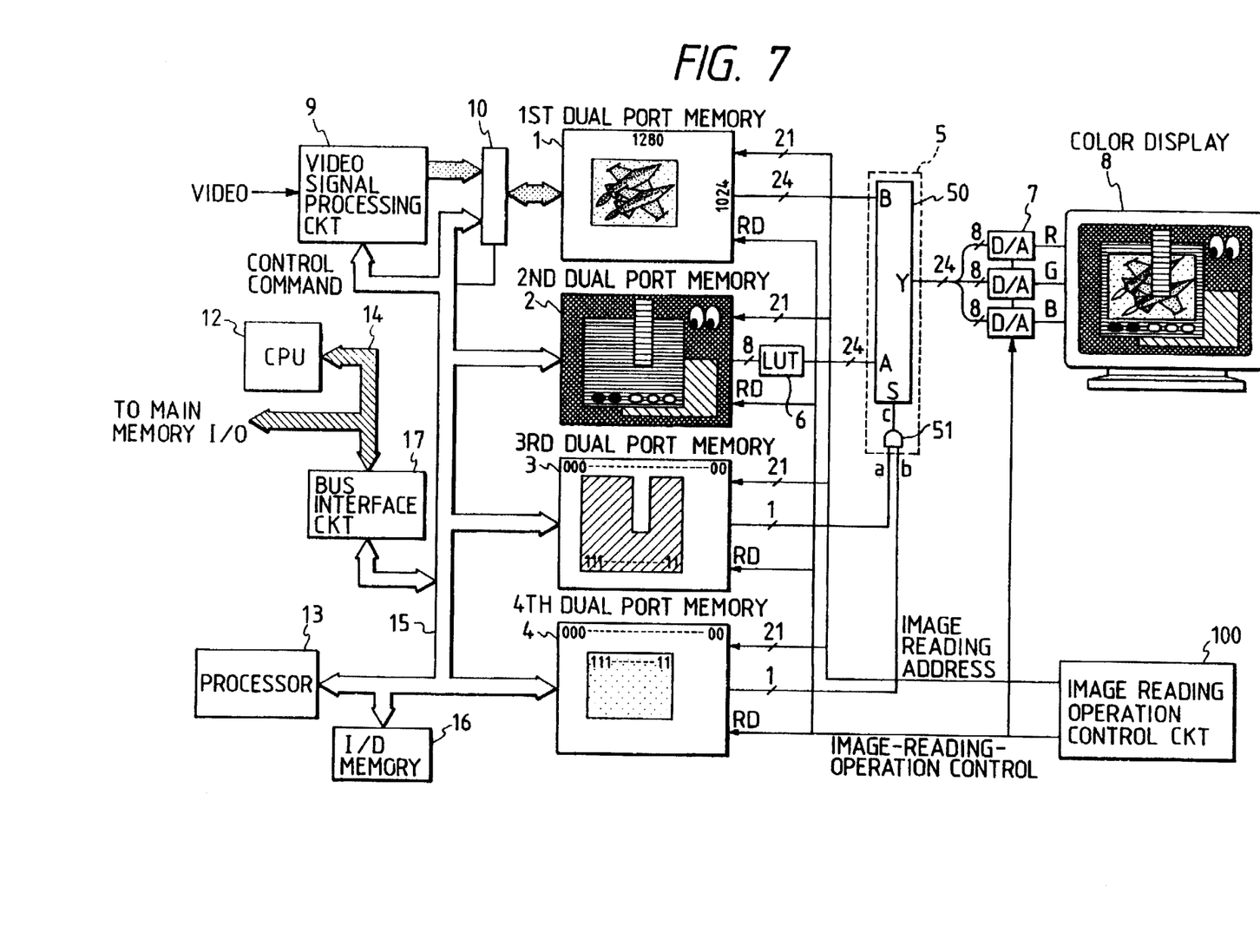
FIG. 7 is a schematic block diagram for illustrating the configuration of a seventh embodiment of (namely, a seventh dynamic-image displaying workstation embodying) the present invention.

FIG. 7 is a schematic block diagram for illustrating the configuration of the seventh embodiment of (namely, the seventh dynamic-image displaying workstation embodying) the present invention. In this figure, reference numerals 1, 2, 3 and 4 designate first, second, third and fourth dual port memories; 5 a data selector; 6 a color lookup table (device); 7 a D/A converter; 8 a color display; 9 a video signal processing circuit; 12 a CPU; 14 a first data bus; 50 a multiplexer; 51 an AND gate circuit; and 100 an image-reading-operation control device for outputting an image-data reading control signal and an image-data reading address signal. These composing elements have the same functions as the corresponding elements of the first dynamic-image displaying workstation indicated by like reference numerals in FIG. 1 do. Further, reference numeral 13 denotes a processor; 15 a second data bus; 16 an instruction/data memory; and 17 a bus interface circuit. These composing elements have the same functions as the corresponding elements of the second dynamic-image displaying workstation indicated by like reference numerals in FIG. 2 do. Moreover, reference numeral 10 denotes a read/write control circuit which has the same function as the circuit 10 of the fourth embodiment of FIG. 4, but is connected to the second data bus 15 and thus the processor 13 can read dynamic-image data written to the first dual port memory 1 and write the dynamic-image data thereto. The CPU 12 of this workstation runs UNIX, which is a time-sharing/multi-tasking OS, and the client programs of the X window system, which is a multiple-window system. The processor 13 can execute an instruction down-loaded by the CPU 12 to the instruction/data memory 16 independently of the CPU 12. The processor 13 sets control commands (namely, the contents of a processing to be performed on a video signal) in the video signal processing circuit 9 and writes to the second to fourth dual port memories 2, 3 and 4 data corresponding to these memories, respectively. The read/write control circuit 10, which is usually set to input dynamic-image data processed by and continually outputted from the video signal processing circuit 9 and to continually write the input dynamic-image data to the first dual port memory 1. Further, data representing a character and a graphic form is written by the CPU 12 to the second dual port memory 2. Moreover, data representing a window area is written by the CPU 12 to the third dual port memory 3 (namely, a window-area plane). Furthermore, data representing a dynamic-image display effective area is written by the processor 13 to the fourth dual port memory 4 (namely, a dynamic-image area plane). A part of the workstation, which includes the first to fourth dual port memories 1 to 4 and is illustrated in the right half of FIG. 7, operate in the same manner as in case of the first embodiment of FIG. 1. Thus a video dynamic-image of jet planes, which belongs to multiple window, can be displayed on the screen of the color display 8.

Next, an operation of the other part of the workstation illustrated in the left half of FIG. 7 will be described hereinbelow. First, the CPU 12 preliminarily sends a request for the acquisition of the second data bus 15 to the bus interface circuit 17 and then downloads to the instruction/ data memory 16 a group of routines (including a server program (for instance, a drawing routine) of the X window system) for generating data representing a graphic form and a character font to be written to the second dual port memory 2, a group of routines for generating a pattern of the window area to be written to the window-area plane 3, a group of routines for generating a pattern of the dynamic-image display effective area to be written to the dynamic-image area plane 4, a sequence of control commands to be provided to the video signal processing circuit 9 and a group of routines for changing the conditions set in the read/write control circuit 10 and transferring, processing and storing data representing a freezed static image stored in the first dual port memory 1. Upon completion of the downloading, the CPU 12 releases the second data bus 15 and gives back the proprietorship of the second data bus to the processor 13. Thereafter, when a request for updating the state of the window containing the dynamic image is caused due to the phenomena that the window becomes covered by another window, or that the window is moved, the CPU 12 performs a suitable processing routine, for example, writes data representing new graphic forms to the second dual port memory 2 or writes data representing a new window area to the window-area plane 3. Further, if the updating of the state of the window affects the dynamic image, the CPU 12 immediately directs the processor 13 through the bus interface circuit 17 to set a group of new control commands in the video signal processing circuit 9 and write a group of new patterns of the dynamic-image effective area to the dynamic-image area plane at a high speed. As previously stated, that the processor can perform such operations at a high speed means that the processor can perform such operations continuously and straight as intended without "looking away" (namely, such operations can be prevented from being performed discontinuously).

This embodiment is characterized in that the processor 13, which can operate independently of the CPU 12 running a non-real-time OS, is made to run a server program (including a drawing routine), and perform the updating operation on the video signal processing circuit 9 and the dynamic-image area plane 4 at a high speed in real time, and write to the second dual port memory 2 data required for effecting a drawing of a graphic form, and perform the updating operation on the window-area plane 3 at a high speed in real time. This ensures more reliably that a special-effect operation can be performed on the dynamic image in real time and that a response to change in the state of the window, as well as a drawing of a graphic form, can be effected at a high speed. This embodiment is further characterized in that the read/write control circuit 10 is provided in the workstation and thereby, the dynamic-image data stored in the first dual port memory 1 can be accessed by the processor 13 when the dynamic image represented by the dynamic-image data, which is usually made to move continually, is stopped (namely, freezed) at a given moment and is utilized as a static image. Consequently, this dynamic-image displaying workstation has outstanding merits in the application of multi-media using a dynamic image, for example, in case where a video dynamic-image taken by a video camera is sampled and recognized every 0.5 seconds (or every second) and the execution of a special processing routine for, for instance, displaying an image of a predetermined design or a warning sound is started when an image meeting a predetermined condition, for instance, an image of a red object occupying nearly the entire screen of the display is received.

Incidentally, the instruction/data memory 16 is connected only to the second data bus 15 as illustrated in FIG. 7. However, the present invention is not limited to such a configuration. For instance, a dual port memory connected to both of the first and second data buses 14 and 15 may be employed. In case of employing such a dual port memory, preferably, there occurs no overhead required for the acquisition of the second data bus 15.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A dynamic-image displaying workstation, comprising:
a display having a screen;
means for setting a changeable window area on the screen of the display;
means for setting a changeable dynamic-image display effective area on the screen of the display;

means for displaying a dynamic image only in an area on the screen of the display in which the window area and the dynamic-image display effective area overlap each other;

means for displaying a window image in a portion of the window area which is separate from the dynamic-image display effective area; and means for displaying an out-window image in an area on the screen which is separate from the window area.

2. The workstation according to claim 1, which further comprises means for changing the window area, and means, being separate from the window-area changing means, for changing the dynamic-image display effective area.

3. A dynamic-image displaying workstation, comprising:

a display having a screen;

means for setting a changeable window area on the screen of the display in response to first information representing the window area;

means for setting a changeable dynamic-image display effective area on the screen of the display in response to second information representing the dynamic-image display effective area;

means, being responsive to the first information and the second information and also to third information representing a dynamic image, for displaying the dynamic image only in an area on the screen of the display in which the window area and the dynamic-image display effective area overlap each other; and means, being responsive to the first information and the second information and also to fourth information representing a second image composed of a window image and an out-window image, for displaying the window image in a portion of the window area which is separate from the dynamic-image display effective area, and for displaying the out-window image in an area on the screen which is separate from the window area.

4. The workstation according to claim 3, which further comprises means for updating the first information to change the window area, and means, separate from the first-information updating means, for updating the second information to change the dynamic-image display effective area.

5. A dynamic-image displaying workstation, comprising:

a display device having a screen;

data outputting circuitry for outputting first information representing a changeable window area on the screen, second information representing a changeable dynamic-image display effective area on the screen, fourth information representing a dynamic image and fifth information representing a second image composed of a window image and an out-window image;

means, being responsive to the first information representing a changeable window area on the screen and the second information representing a changeable dynamic-image display effective area on the screen, for generating third information from the first information and the second information, the third information representing an overlap area on the screen in which the window area and the dynamic-image display effective area overlap each other; and means, being responsive to the first information and the third information and receiving fourth information representing a dynamic image and fifth information representing a second image composed of a window image and an out-window image, for selecting one of the fourth information and the fifth information and feeding the selected one of the fourth information and the fifth information to the display device in response to the third information so that the dynamic image will be indicated only in the overlap area on the screen, that the window image will be indicated only in a portion of the window area on the screen which is separate from the overlap area on the screen, and that the out-window image will be indicated in an area on the screen which is separate from the window area.

* * * * *